(12) United States Patent
Martinoni et al.

(10) Patent No.: US 10,131,796 B2
(45) Date of Patent: Nov. 20, 2018

(54) POWDER COATING COMPOSITION

(71) Applicant: Valspar Sourcing, Inc., Minneapolis, MN (US)

(72) Inventors: Raffaele Martinoni, Wolfhausen (CH); Rolf Frischkopf, Wetzikon (CH)

(73) Assignee: THE SHERWIN-WILLIAMS COMPANY, Cleveland, OH (US)

( * ) Notice: Subject to any disclaimer, the term of this patent is extended or adjusted under 35 U.S.C. 154(b) by 367 days.

(21) Appl. No.: 14/438,478

(22) PCT Filed: Mar. 14, 2013

(86) PCT No.: PCT/US2013/031399
§ 371 (c)(1),
(2) Date: Apr. 24, 2015

(87) PCT Pub. No.: WO2014/065858
PCT Pub. Date: May 1, 2014

(65) Prior Publication Data
US 2015/0291804 A1 Oct. 15, 2015

Related U.S. Application Data

(60) Provisional application No. 61/718,913, filed on Oct. 26, 2012.

(51) Int. Cl.
| | | |
|---|---|---|
| *C09D 167/00* | (2006.01) | |
| *C08L 67/00* | (2006.01) | |
| *C09D 5/03* | (2006.01) | |
| *C09D 167/02* | (2006.01) | |

(Continued)

(52) U.S. Cl.
CPC .............. *C09D 5/03* (2013.01); *B05D 1/12* (2013.01); *B05D 3/0254* (2013.01); *B05D 7/227* (2013.01);

(Continued)

(58) Field of Classification Search
CPC ........ C09D 167/00; C09D 5/03; C09D 5/031; C08L 67/02
See application file for complete search history.

(56) References Cited

U.S. PATENT DOCUMENTS 5,942,285 A * 8/1999 Schmid .................. B05D 1/265
427/318
5,994,462 A * 11/1999 Srinivasan .............. C08L 67/02
427/386

(Continued)

FOREIGN PATENT DOCUMENTS

CN 1088599 A 6/1994
EP 0016265 A1 10/1980

(Continued)

OTHER PUBLICATIONS

International Search Report and Written Opinion of International Application No. PCT/US2013/031399, dated Jul. 23, 2013, 14 pp.

(Continued)

*Primary Examiner* — Rip A Lee
(74) *Attorney, Agent, or Firm* — Shumaker & Sieffert, P.A.

(57) ABSTRACT

A coating composition comprising a blend of one or more polyester resins having a lower average molecular weight and higher melt flow index, where the coating composition is in the form of a powder having particles with a fine particle size distribution, and where the coating composition is configured to form a thin coating (34) that is substantially free of pores.

13 Claims, 4 Drawing Sheets

(51) Int. Cl.
  *C09D 133/08* (2006.01)
  *B65D 6/00* (2006.01)
  *B05D 1/12* (2006.01)
  *B05D 3/02* (2006.01)
  *B05D 7/22* (2006.01)

(52) U.S. Cl.
  CPC ............ *B65D 7/42* (2013.01); *C09D 133/08* (2013.01); *C09D 167/00* (2013.01); *C09D 167/02* (2013.01)

(56) References Cited

U.S. PATENT DOCUMENTS

| | | | | |
|---|---|---|---|---|
| 6,270,855 | B1 * | 8/2001 | Jung | B05D 1/265 427/482 |
| 6,458,439 | B1 * | 10/2002 | Jung | B05D 1/265 428/35.8 |
| 6,472,472 | B2 | 10/2002 | Jung et al. | |
| 8,461,250 | B2 * | 6/2013 | Schollenberger | C08L 67/02 524/539 |
| 2012/0270983 | A1 * | 10/2012 | Skillman | C09D 167/02 524/360 |
| 2015/0021323 | A1 | 1/2015 | Niederst et al. | |

FOREIGN PATENT DOCUMENTS

KR  100480220 B1  7/2005
WO  9411446 A  5/1994

OTHER PUBLICATIONS

International Preliminary Report on Patentability from International Application No. PCT/US2013/031399, dated May 7, 2015, 9 pp.
First Office Action, and translation thereof, from counterpart Chinese Patent Application No. 201380061550.8, dated Mar. 28, 2016, 15 pp.
Extended Search Report from counterpart European Application No. 13848692.3, dated Jun. 2, 2016, 7 pp.
Examination Report from counterpart European Application No. 13848692.3, dated Feb. 23, 2017, 4 pp.
Second Office Action, and translation thereof, from counterpart Chinese Application No. 201380061550.8, dated Nov. 18, 2016, 19 pp.
Reply to the Communication pursuant to Rules 70(2) and 70a(2) EPC dated Jun. 21, 2016, from Counterpart European Application No. 13848692.3, filed Dec. 30, 2016, 14 pp.
Response to Rules 70(2) and 70a(2) EPC dated Jun. 21, 2016, from counterpart European Application No. 13848692.3-1301, filed Dec. 30, 2016, 14 pp.
Response to Examination Report dated Feb. 23, 2017, from counterpart European Application No. 13848692.3, filed Sep. 5, 2017, 2 pp.
Third Office Action and translation thereof, from counterpart Chinese Application No. 201380061550.8, dated May 17, 2017, 22 pp.
Sulan et al., "Powder Coating" Chemical Industry Press, in the Chinese language only, ISBN 7-5025-5879-9, Sep. 2004, 8 pp.
Renzhi et al., "Powder Coating and Application Technology", ISBN 978-7-122-02553-1, Aug. 2008, 11 pp.
Response to Examination Report dated Nov. 10, 2017, from counterpart European Application No. 13848692.3, filed May 22, 2018, 14 pp.
Fourth Office Action, and translation thereof, from counterpart Chinese Application No. 201380061550.8, dated Jan. 3, 2018, 19 pp.
Examination Report from counterpart European Application No. 13848692.3, dated Nov. 10, 2017, 5 pp.

* cited by examiner

POWDER COATING COMPOSITION

CROSS REFERENCE TO RELATED APPLICATIONS

This application is a national stage entry under 35 U.S.C. § 371 of PCT Application No. PCT/US2013/031399, filed Mar. 14, 2013, which claims the benefit of U.S. Provisional Application No. 61/718,913, filed Oct. 26, 2012. The entire contents of PCT Application No. PCT/US2013/031399 and U.S. Provisional Application No. 61/718,913 are incorporated herein by reference.

FIELD

The present disclosure is directed to coating compositions for forming coatings on substrates. In particular, the present disclosure is directed to powder coating compositions for forming coatings on container substrates, such as side seam substrates of food and beverage containers.

BACKGROUND

It is well known that an aqueous solution in contact with an untreated metal substrate can result in corrosion of the untreated metal substrate. Therefore, a metal article, such as a metal container for a water-based product, like a food or beverage, is rendered corrosion resistant in order to retard or eliminate interactions between the water-based product and the metal article. Generally, corrosion resistance is imparted to the metal article, or to a metal substrate in general, by passivating the metal substrate, or by coating the metal substrate with a corrosion-inhibiting coating.

In addition, practical considerations limit the thickness, adhesive properties, and flexibility of a coating applied to a metal substrate. For example, thick coatings are expensive, require a longer cure time, can be esthetically unpleasing, and can adversely affect the process of stamping and molding the coated metal substrate into a useful metal article. Similarly, the coating should be sufficiently flexible such that the continuity of the coating is not destroyed during stamping and molding of the metal substrate into the desired shape of the metal article.

Conventionally, organic solvent-based coating compositions were used to provide cured coatings having excellent chemical resistance. Such solvent-based compositions include ingredients that are inherently water insoluble, and thereby effectively resist the solvating properties of water-based products packaged in the metal container. However, because of environmental concerns, and in order to comply with increasingly strict governmental regulations, an increasing number of coating compositions are water-based. The water-based coating compositions include ingredients that are water-soluble or water-dispersible, and, therefore, cured coatings resulting from water-based coating compositions often are more susceptible to the solvating properties of water.

SUMMARY

An aspect of the present disclosure is directed to a method for forming a coating on a container. The method includes providing a coating composition having a blend of one or more polyesters preferably having a lower average molecular weight (e.g., a weight-average molecular weight ranging from about 20,000 to about 50,000), and a high melt flow index (e.g., a melt flow index greater than about 50 grams/10 minutes). Furthermore, the coating composition is in the form of a powder having a fine particle size distribution (e.g., particles with particle sizes such that at least 95% by weight, and in some embodiments at least about 99.9% by weight of the particles are capable of passing through an 80-micrometer sieve).

The method may also includes applying the coating composition in powder form to at least a portion of a substrate of the container, melting the coating composition on the substrate or the portion thereof, and solidifying the molten coating composition to form the coating adhered to the substrate or the portion thereof. The adhered coating preferably has a low coating thickness (e.g., an average coating thickness ranging less than about 40 micrometers) and is preferably substantially free of pores.

Another aspect of the present disclosure is directed to a coating composition that includes a blend of one or more polyesters preferably having a low average molecular weight (e.g., a weight-average molecular weight ranging from about 20,000 to about 50,000) and a high melt flow index (e.g., a melt flow index greater than about 50 grams/10 minutes), where the coating composition is in the form of a powder having particles with a fine particle size distribution. For example, the particles may have particle sizes such that at least about 95% by weight, and more preferably at least about 99.9% by weight of the particles are capable of passing through an 80-micrometer sieve. In preferred embodiments, the coating composition is configured to form a thin coating (e.g., having an average coating thickness less than about 40 micrometers) that is preferably substantially free of pores.

Another aspect of the present disclosure is directed to a container that includes a substrate and a coating disposed on at least a portion of the substrate. The coating preferably has a low coating thickness (e.g., an average coating thickness less than about 40 micrometers), where the coating is preferably substantially free of pores. The coating may be formed from a coating composition that includes a blend of one or more polyesters preferably having a low average molecular weight (e.g., a weight-average molecular weight ranging from about 20,000 to about 50,000), and a high melt flow index (e.g., a melt flow index greater than about 50 grams/10 minutes). The coating composition, prior to being formed on the substrate, is preferably in the form of a powder having a fine particle size distribution (e.g., particles with particle sizes such that at least about 95% by weight, and more preferably at least about 99.9% by weight of the particles are capable of passing through an 80-micrometer sieve).

DEFINITIONS

Unless otherwise specified, the following terms as used herein have the meanings provided below:

The terms "first polyester" and "second polyester" each refer to one or more polyester polymers and/or copolymers.

The expression of a coating that is "substantially free of pores" means that the coating does not exhibit any pores that are visible to the naked eye after being subjected to the Porosity Test described below in the Examples section.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The terms "about" and "substantially" are used herein with respect to measurable values and ranges due to expected variations known to those skilled in the art (e.g., limitations and variabilities in measurements).

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyester is interpreted to include one or more polymer molecules of the polyester, where the polymer molecules may or may not be identical (e.g., different molecular weights, isomers, etc . . . ).

The term "substantially free" of a particular compound means that the compositions of the present disclosure contain less than 100 parts per million (ppm) of the recited compound. The term "essentially free" of a particular compound means that the compositions of the present disclosure contain less than 10 ppm of the recited compound. The term "essentially completely free" of a particular compound means that the compositions of the present disclosure contain less than 1 ppm of the recited compound. The term "completely free" of a particular compound means that the compositions of the present disclosure contain less than 20 parts per billion (ppb) of the recited compound.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present disclosure is directed to a powder coating composition for forming coatings on substrates, such as metal substrates for containers of food, beverages, and other products (e.g., aerosol containers). The present disclosure is also directed to containers having the coatings, such as weld seam coatings, formed from the powder coating composition, and related methods of application. As discussed below, the powder coating composition may be used to form thin coatings that are preferably substantially free of pores, such as discontinuities and cavities. This provides good sealing properties to protect the underlying substrates, while also allowing the substrates to be downgauged (i.e., made thinner).

Figure 1:
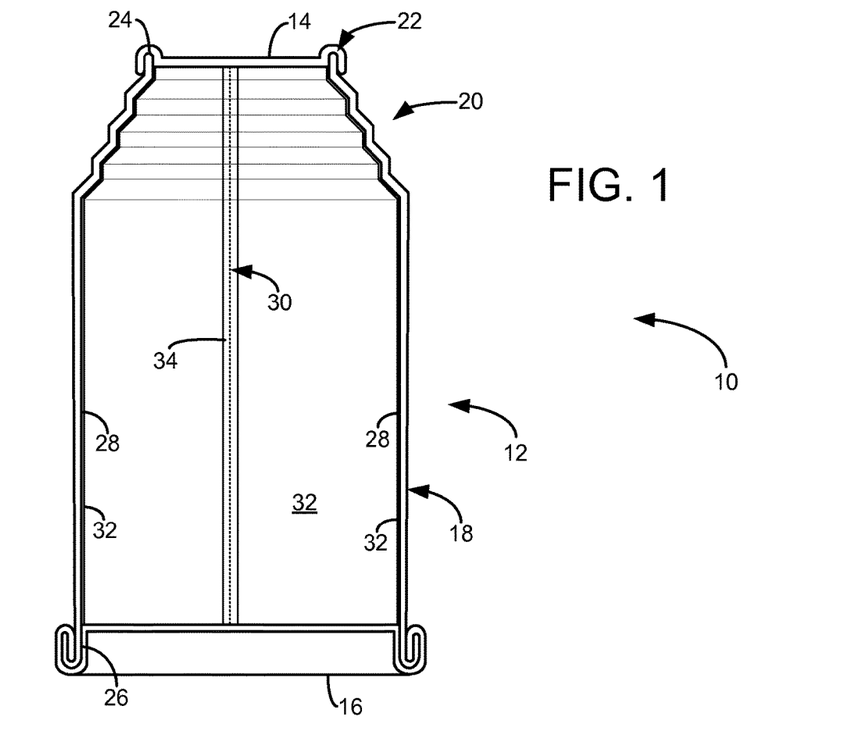
FIG. 1 is a schematic illustration of a container having a weld seam coating formed from a powder coating composition of the present disclosure.

For example, FIG. 1 shows container 10, which is an example container that may be sealed with the powder coating composition of the present disclosure. Container 10 may be a three-piece can having body 12, lid piece 14, and bottom piece 16, where body 12 includes sidewall 18, neck portion 20, and upper rim 22. In the shown embodiment, neck portion 20 narrows in a multiple-step (e.g., a four-step) necking arrangement, which is preferred when body 12 is fabricated from a thin plate (e.g., from about 100 micrometers to about 150 micrometers thick).

Lid piece 14 may be sealed to upper rim 22 of body 12 in a flanged manner to form lid seal 24, and may include one or more tabs (not shown) to facilitate peeling off or opening of lid piece 14. The bottom end of sidewall 18 may correspondingly be sealed to bottom piece 16 to form bottom seal 26.

As further shown, body 12 also includes inner surface 28 for sidewall 18 and neck portion 20, and weld seam 30 (illustrated with a broken line in FIG. 1). As is typical for three-piece containers, body 12 may be fabricated from a plate or sheet of a substrate material, which is shaped into a cylindrical geometry and secured at weld seam 30. Suitable substrate materials for body 12 (and lid piece 14 and bottom piece 16) include metallic materials, such as aluminum, iron, tin, steel, copper, and the like. Neck portion 20 may then be shaped from body 12 with a necking machine (not shown).

To protect sidewall 18 and neck portion 20 from corrosion and other environmental conditions during use, one or more portions of inner surface 28 may be pre-coated with sidewall coating 32, preferably across the entirety of inner surface 28 except at weld seam 30. For example, sidewall coating 32 may be applied to inner surface 28 prior to shaping body 12 into its cylindrical geometry.

However, at weld seam 30, container 10 includes coating 34, which covers and seals at least a portion of weld seam 30 along the length of weld seam 30 (i.e., along sidewall 18 and neck portion 20), and more preferably along the entire length of weld seam 30. As discussed below, coating 34 may be formed from the powder coating composition of the present disclosure to protect the interior side of body 12 at weld seam 30.

Figure 2:
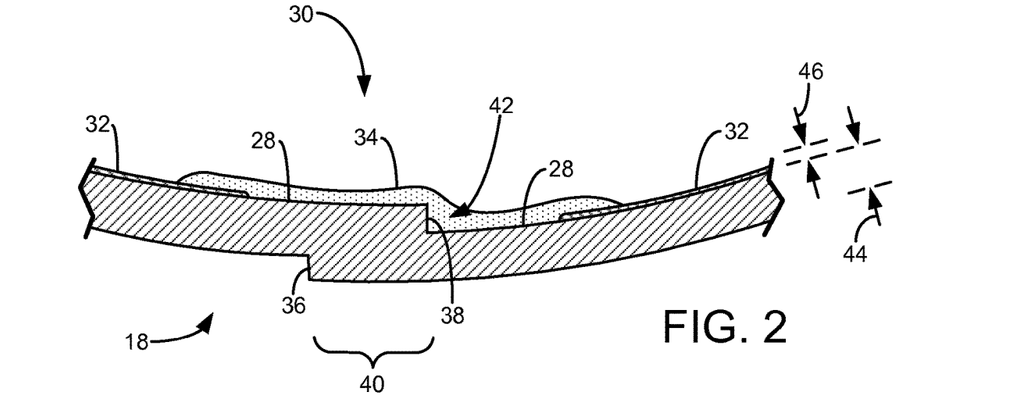
FIG. 2 is a sectional view of a weld seam of the container, further illustrating the weld seam coating.

As further shown in FIG. 2, during assembly of body 12, the edges of sidewall 18, referred to as edges 36 and 38, may be welded or otherwise joined together to define the cylinder geometry. This results in an overlap region 40 at weld seam 30 with a step 42 at inner surface 28. In one common method of welding, resistance welded seams are formed having overlap region 40 of approximately 0.4 millimeters to 0.8 millimeters.

Then, to protect sidewall 18 at weld seam 30 during use, the powder coating composition of the present disclosure may be applied to weld seam 30 at inner surface 28, and may be melted and solidified to form coating 34. This adheres coating 34 to inner surface 28 at weld seam 30. As shown, coating 34 also preferably extends over and adheres to portions of sidewall coating 32 to fully seal inner surface 28 at weld seam 30.

Conventionally, it was believed that weld seam coatings having coating thicknesses less than about 50 micrometers resulted in unwanted pores, such as discontinuities and cavities in the coatings. These pores undesirably exposed the underlying weld seams to potential corrosion or other environmental conditions during use. Thus, weld seam coatings for three-piece containers typically have coating thicknesses greater than about 50-70 micrometers, which is suitable for many applications, such as for containers having wall thicknesses greater than about 0.2 millimeters.

However, some container manufacturers may desire to downguage their containers to produce containers having thinner and thinner walls, such as to reduce material costs. For example, some container manufacturers may desire to produce containers having wall thicknesses even down to about 0.1 millimeters. In these thin-wall applications, the containers typically require multiple-step neckings, such as a three-step necking arrangement or the four-step necking of neck portion 20 (shown in FIG. 1).

However, to overcome the mechanical stress imposed by a necking machine without damaging the container substrate, weld seam coatings with coating thicknesses greater than about 40-50 micrometers applied on thin container walls are typically not usable as they can routinely become stuck in the necking machines and can damage the container wall. As such, the powder coating composition of the present disclosure is advantageous for use with containers having thin walls, since it is capable of forming thin coatings (e.g., less than about 40 micrometers) that are substantially free of pores. This allows the containers to be reliably necked with multiple steps.

As further shown in FIG. 2, body 12, including sidewall 18, has a wall thickness 44, which is an average wall thickness taken at a location that is outside of overlap region 40. As discussed above, container 10 may be a thin-wall container, such as to reduce material costs during manufacturing. In this embodiment, wall thickness 44 may be at least about 80 micrometers to less than about 200 micrometers, more preferably at least about 100 micrometers to less than about 150 micrometers, and even more preferably at least about 100 micrometers to less than about 120 micrometers. While the powder coating composition of the present disclosure is particularly useful for forming thin coatings on thin-wall containers, the powder coating composition may also be used to form coatings on containers having thicker walls as well, such as wall thicknesses up to about 300-400 micrometers, if desired.

Correspondingly, coating 34 has a coating thickness 46, which is an average coating thickness taken relative to inner surface 28 at a location along weld seam 30 other than at sidewall coating 32 or step 42. For use with body 12 having wall thickness 44 with the above-discussed dimensions, coating thickness 46 may be less than about 40 micrometers, and more preferably about 35 micrometers or less. Coating thickness 46 may also be at least about 20 micrometers, more preferably at least about 25 micrometers.

Furthermore, the powder coating composition is preferably capable of forming a coating at these coating thicknesses (e.g., coating 34) that is substantially free of pores when subjected to the following Porosity Test, which is also described below in the Examples section: A sample metal strip of tin-plated steel (having a wall thickness of 0.12 millimeters) and retaining the formed coating, is placed in a bath of a 3.2% copper sulfate ($CuSO_4$) and 0.5% acetic acid in water solution such that the formed coating is fully immersed in the solution. A cathode pole lead of a direct current (DC) 9-volt battery is connected to an edge of the metal strip. A 2-centimeter-by-8 centimeter copper plate (having a 2-millimeter thickness) connected to an anode pole of the battery is inserted into the solution and moved along the formed coating at a distance of about five millimeters from the coating for about three seconds. The metal strip is then removed from the solution, dried, and inspected for the presence of any pores that are visible to the naked eye.

The powder coating composition of the present disclosure used to form coating 34 may include a blend of one or more polyesters, and optionally, one or more additives. The resulting coating 34 provides good corrosion inhibition to underlying metal substrates, good adhesion to the metal substrates and to any suitable sidewall coating (e.g., sidewall coating 28), good chemical resistance, and good flexibility. Furthermore, the resulting coating 34 preferably does not impart a taste to foods or beverages that contact the applied powder coating composition.

The blend of one or more polyesters may include a first polyester, and, optionally, a second polyester having a higher glass transition temperature than the first polyester. The first polyester may have a weight-average molecular weight of at least about 20,000, more preferably at least about 25,000, and even more preferably at least about 30,000. The weight-average molecular weight of the first polyester may also be less than about 50,000, and preferably less than about 40,000. The first polyester may also have a number-average molecular weight of at least about 8,000, more preferably at least about 10,000, and even more preferably at least about 12,000. The number-average molecular weight of the first polyester may also be less than about 20,000, more preferably less than about 16,000, and even more preferably less than about 15,000.

The first polyester may have a melt flow index greater than about 80 grams/10 minutes, more preferably greater than about 100 grams/10 minutes, and even more preferably greater than about 130 grams/10 minutes, where the "melt flow index" referred to herein is measured pursuant to ASTM D1238-10 at 190° C. and with a 2.16 kilogram weight. The melt flow index of the first polyester may also be less than about 170 grams/10 minutes, and even more preferably less than about 150 grams/10 minutes. The first polyester may alternatively be referred to based on its melt viscosity, which can be calculated from its melt flow index. Accordingly, the first polyester may also have a melt viscosity less than about 200 Pascal-seconds (Pa-s), more preferably less than about 150 Pa-s, and even more preferably less than about 100 Pa-s.

The first polyester is also preferably a semi-crystalline polyester having a glass transition temperature of at least about −20° C., more preferably at least about 10° C., and even more preferably at least about 15°. The glass transition temperature of the first polyester may also be less than about 40° C., more preferably less than about 35° C., and even more preferably from about 25° C. or less. Similarly, the first polyester may have a melting temperature of at least about 120° C., more preferably of at least about 130° C., and even more preferably of at least about 140° C. The melting temperature of the first polyester may also be less than about 200° C., more preferably less than about 170° C., and even more preferably less than about 160° C. As used herein, the "glass transition temperature" and the "melting temperature" may each be determined using differential scanning calorimetry (DSC).

As briefly mentioned above, the blend of one or more polyesters may also include a second polyester having a higher glass transition temperature. In this embodiment, the second polyester may have any suitable molecular weight, such as a weight-average molecular weight of at least about 40,000, more preferably at least about 44,000, and even more preferably at least about 48,000. The weight-average molecular weight of the second polymer may also be less than about 70,000, more preferably less than about 60,000, and even more preferably less than about 55,000. The weight-average molecular weight of the second polyester is preferably higher than that of the first polyester by at least about 15,000, and more preferably by at least about 20,000.

The second polyester may also have a number-average molecular weight of at least about 10,000, more preferably at least about 15,000, and even more preferably at least about 18,000. The number-average molecular weight of the second polyester may also be less than about 30,000, more preferably less than about 27,000, and even more preferably less than about 25,000. The number-average molecular weight of the second polyester is preferably higher than that of the first polyester by at least about 3,000, and more preferably by at least about 5,000.

The second polyester may also have a melt viscosity that is greater than that of the first polyester, and a melt flow index that is less than that of the first polyester. For example, the second polyester may have a melt viscosity of at least about 150 Pa-s, more preferably at least about 175 Pa-s, and even more preferably of at least about 200 Pa-s. The melt viscosity of the second polyester may also be less than about 300 Pa-s, more preferably less than about 250 Pa-s, and even more preferably less than about 230 Pa-s. The melt viscosity of the second polyester is preferably higher than that of the first polymer by at least about 100 Pa-s, and more preferably by at least about 125 Pa-s.

The second polyester may further have a melt flow index of at least about 25 grams/10 minutes, more preferably at least about 30 grams/10 minutes, and even more preferably at least about 40 grams/10 minutes. The melt flow index of the second polyester may also be less than about 75 grams/10 minutes, more preferably less than about 60 grams/10 minutes, and even more less than about 50 grams/10 minutes. The melt flow index of the second polyester is preferably lower than that of the first polymer by at least about 50 grams/10 minutes, and more preferably by at least about 75 grams/10 minutes. In some embodiments, the melt viscosity and the melt flow index of the second polyester are each similar to those of the first polymer (e.g., within the ranges disclosed herein for the first polyester).

Moreover, the second polyester is also preferably an amorphous polyester having a glass transition temperature that is preferably greater than that of the first polymer by at least about 25° C., and more preferably by at least about 40° C. For example, the glass transition temperature of the second polyester preferably may be at least about 50° C., more preferably at least about 60° C., and even more preferably at least about 65° C. The glass transition temperature of the second polyester may also be less than about 100° C., more preferably less than about 80° C., and even more preferably less than about 75° C.

In some embodiments, the first polyester may constitute from about 70% to 100% by weight of the polyester blend, and more preferably from about 85% to 100% by weight of the polyester blend. In some embodiments, the first polyester may constitute from about 90% to 100% by weight of the polyester blend. In embodiments in which the polyester blend includes the second polyester, the second polyester may constitute from about 1% to about 30% by weight of the polyester blend, and more preferably from about 5% to about 15% by weight of the polyester blend.

The first and second polyesters may be prepared, for example, by condensing a dicarboxylic acid with a diol (e.g., an aliphatic diol). In some embodiments, the dicarboxylic acid may include terephthalic acid, isophthalic acid, a naphthalene dicarboxylic acid, or mixtures thereof. It is also understood that an esterifiable derivative of a dicarboxylic acid, such as a dimethyl ester or anhydride of a dicarboxylic acid, can be used to prepare the polyesters.

In particular, exemplary dicarboxylic acids used to prepare the first and second polyesters may include aliphatic and aromatic dicarboxylic acids, such as, but not limited to, phthalic acid, isophthalic acid, terephthalic acid, 5-tert-butyl isophthalic acid, adipic acid, malonic acid, 2,6-naphthalenedicarboxylic acid, 1,5-naphthalenedicarboxylic acid, hexahydroterephthalic acid, 1,4-cyclohexanedicarboxylic acid, sebacic acid, azeleic acid, succinic acid, glutaric acid, fumaric acid, and mixtures and esterifiable derivatives thereof. Substituted aliphatic and aromatic dicarboxylic acids, such as halogen or alkyl-substituted dicarboxylic acids, may also be useful.

Non-limiting examples of diols that may be useful in preparing the first and second polyesters may include ethylene glycol, diethylene glycol, triethylene glycol, propylene glycol, dipropylene glycol, hexylene glycol, butylene glycol, pentylene glycol, neopentyl glycol, trimethylpropane diol, 1,4-cyclohexanedimethanol, 1,10-decanediol, 2,2-dimethyl-1,3-propanediol, 2,2,4,4-tetramethyl-1,3-cyclobutandiol, a polyethylene or polypropylene glycol having a molecular weight of about 500 or less, and mixtures thereof. A small amount of a triol or polyol, such as, 0 to 3 mole % of diol, can be used to provide partially branched polyesters, as opposed to linear polyesters.

The diol and the dicarboxylic acid, in correct proportions, may be reacted under standard esterification procedures to provide the first and second polyesters having the desired molecular weights, glass transition temperatures, molecular weight distributions, branching (if any), crystallinities, and functionality for use in a present powder coating composition. In general, the first polyester preferably has a lower concentration of aromatic groups compared to the second polyester to maintain a lower glass transition temperature. Useful polymers and copolymers for the first and second polyesters include polyethylene terephthalates (PET), polyethylene terephthalates derived from both terephthalic acid and isophthalic acid (PET-I), polybutylene terephthalates (PBT), polyethylene naphthalates (PEN), and polybutylene naphthalates (PBN), polytrimethylene terephthalate (PTT), polytrimethylene naphthanate (PTN), and copolymers and mixtures thereof. Such polyesters may include any combination of one or more additional co-monomers.

In addition, suitable polymers and copolymers for the first and second polyesters are commercially available under the tradename GRILTEX, from EMS-Griltech, Switzerland. Examples of specific polyesters for the first polyester include GRILTEX D2343, available as a copolymer from EMS-Griltech, Switzerland. Examples of specific polyesters for the second polyester include GRILTEX D2360, available as a copolymer from EMS-Griltech, Switzerland.

It has been found that a blend of the first and second polyesters having the above-described properties may produce a powder coating composition having pack and mechanical properties that are similar to a standard side stripe powder, but at thinner coating thicknesses. In addition, the first and second polyesters have lower melt viscosities compared to melt viscosities of polyesters typically used for weld seam coatings, particularly the first polyester. This is beneficial for fine milling the blend to reliably produce small powder particles. The small particles are accordingly believed to provide a substantially homogenous blend with good flow properties, thereby allowing the powder coating composition to form thin coatings that are substantially free of pores, such as coating 34.

As used herein, the particle sizes of the blend may be measured using a sieve-based technique. This technique involves sifting a known amount of a powder coating composition through a sieve having a known pore size (e.g., a 100-micrometer sieve, an 80-micrometer sieve, a 63-micrometer sieve, and the like). As can be appreciated, any particles having sizes that are larger than the pore size remain in the sieve, and any particles having sizes that are smaller than the pore size pass through the sieve. After sifting, any remaining amount of the particles that did not pass through the sieve are weighed and compared to the known initial amount of the composition.

The blend of polyesters for the powder coating composition of the present disclosure preferably have a fine particle size distribution such that at least about 95% by weight of the particles are capable of passing through an 80-micrometer sieve, and more preferably at least about 95% by weight of the particles are capable of passing through a 63-micrometer sieve. More preferably, at least about 99% by weight of the particles are capable of passing through an 80-micrometer sieve, and even more preferably at least about 99.9% by weight of the particles are capable of passing through an 80-micrometer sieve. Additionally, more preferably, at least about 97% by weight of the particles are capable of passing through a 63-micrometer sieve, and even more preferably at least about 99% by weight of the particles are capable of passing through a 63-micrometer sieve. The particle size distributions referred to herein are measured pursuant to ASTM E11-09e1. An example of a suitable sieve for determining particle size distributions is commercially available under the tradename HAVER TEST SIEVE from Haver & Boecker OHG, Germany.

In comparison, the particle sizes of commercial thermoplastic weld seam powders typically allow about 100% by weight of the particles to pass through a 100-micrometer sieve, but only allow about 65% to 85% by weight to pass through a 63-micrometer sieve. While not intending to be bound to theory, it is believed that these conventional particle size distributions and their higher melt viscosities prevent these commercial compositions from forming thin coatings (e.g., about 40 micrometers or less) that are substantially free of pores.

In some embodiments, the powder coating composition is preferably substantially free of bisphenol A (BPA) and bisphenol A diglycidyl ether (BADGE) compounds (mobile or bound), and more preferably essentially free of these compounds, and most preferably completely free of these compounds. In addition, in these embodiments, the preferred powder coating composition is also substantially free, more preferably essentially free, and most preferably completely free of: bisphenol S, bisphenol F, bisphenol F diglycidyl ether, and bisphenol S diglycidyl ether compounds.

In some embodiments, the polyester blend (and preferably the powder coating composition) is at least substantially "epoxy-free," more preferably "epoxy-free." The term "epoxy-free," when used herein in the context of a polymer, refers to a polymer that does not include any "epoxy backbone segments" (i.e., segments formed from reaction of an epoxy group and a group reactive with an epoxy group). Thus, for example, a polymer having backbone segments that are the reaction product of a bisphenol (e.g., bisphenol A, bisphenol F, bisphenol S, 4,4'dihydroxy bisphenol, etc.) and a halohdyrin (e.g., epichlorohydrin) would not be considered epoxy-free. However, a vinyl polymer formed from vinyl monomers and/or oligomers that include an epoxy moiety (e.g., glycidyl methacrylate) would be considered epoxy-free because the vinyl polymer would be free of epoxy backbone segments.

Alternatively, in other embodiments, the powder coating composition may include one or more epoxy-containing compounds and/or phenoxy-containing compounds to aid in improving barrier properties of the applied coating and improving adhesion to the underlying metal substrate. In these embodiments, the epoxy-containing compounds and/or phenoxy-containing compounds may be used in lieu of the second polyester, or in combination with the second polyester. Examples of suitable epoxy-containing compounds and phenoxy-containing compounds for the powder coating composition include those disclosed in Jung et al., U.S. Pat. No. 6,472,472, such as aliphatic and aromatic epoxy or phenoxy resins.

The preferred epoxy and phenoxy resins are aromatic, like epoxy and phenoxy resins based on the diglycidyl ether of bisphenol A or bisphenol F. Preferred epoxy and phenoxy resins also include BPA-free and BADGE-free epoxy and phenoxy resins based on the aromatic diepoxides (e.g., diglyidyl ethers) described in U.S. application Ser. Nos. 13/570,632, 13/570,743, and 61/681,394, with the diepoxide of 4,4'-methylenebis(2,6-dimethylphenol) being one such example of an aromatic diepoxide. An epoxy resin can be used in its commercially available form, or can be prepared by advancing a low molecular weight epoxy compound by standard methods well known to those skilled in the art. Exemplary epoxy resins include, but are not limited to those commercially available under the tradename EPON from Shell Chemical Co., Houston, Tex.; those commercially available under the tradename ARALDITE from Huntsman Advanced Materials GmbH, Switzerland; and those commercially available from Kukdo Chemical Co., Ltd., South Korea. The epoxy-containing compounds and/or phenoxy-containing compounds also preferably have a fine particle size distribution as discussed above for the blend of one or more polyesters.

In some embodiments, the powder coating composition is "PVC-free." That is, the powder coating composition preferably contains less than 2% by weight of vinyl chloride materials and other halogenated vinyl materials, more preferably less than 0.5% by weight of vinyl chloride materials and other halogenated vinyl materials, and even more preferably less than 1 ppm of vinyl chloride materials and other halogenated vinyl materials.

As mentioned above, the powder coating composition may optionally include one or more additives. In these embodiments, the blend of one or more polyesters may constitute from about 50% to about 100% by weight of the powder coating composition, more preferably from about 60% to about 90% by weight, and even more preferably from about 70% to about 80% by weight. Accordingly, the powder coating composition, as a whole, may have a melt flow index greater than about 50 grams/10 minutes, more preferably greater than about 80 grams/10 minutes, and even more preferably greater than about 100 grams/10 minutes. Furthermore, the powder coating composition may be provided as a solid, and may be substantially free or entirely free of organic solvents.

Examples of suitable additives for the powder coating composition include colorants, inorganic fillers, surfactants, flow control agents, heat stabilizers, anti-corrosion agents, antioxidants, adhesion promoters, light stabilizers, and combinations thereof. For example, the powder coating composition may include a colorant, such as a pigment or dye. Examples of suitable colorants for use in the powder coating composition include titanium dioxide, barium sulfate, carbon black, and iron oxide, and may also include organic dyes and pigments. The colorant may constitute, e.g., from about 1% to about 50% by weight of the powder coating composition, more preferably from about 10% to about 30% by weight, and even more preferably from about 15% to about 20% by weight. The use of a higher colorant concentration may be advantageous to achieve good coverage with thinner coatings (e.g., coating 34).

Exemplary inorganic fillers used in the powder coating composition of the present invention include, but are not limited to, clay, mica, aluminum silicate, fumed silica, magnesium oxide, zinc oxide, barium oxide, calcium sulfate, calcium oxide, aluminum oxide, magnesium aluminum oxide, zinc aluminum oxide, magnesium titanium oxide, iron titanium oxide, calcium titanium oxide, and mixtures thereof. If present, the inorganic fillers may constitute, e.g., from about 0.1% to about 20% by weight of the powder coating composition, more preferably from about 1% to about 15% by weight, and even more preferably from about 2% to about 10% by weight.

The inorganic fillers are preferably nonreactive, and may be incorporated into the powder coating composition in the form of a powder, preferably with a particle size distribution that is the same or smaller than that of the blend of one or more polyesters. For example, the inorganic filler preferably has a fine particle size distribution such that at least about 95% by weight, and more preferably at least about 99.9% by weight, of the filler particles are capable of passing through an 80-micrometer sieve, and at least about 95% by weight of the filler particles are capable of passing through a 63-micrometer sieve.

An example flow control agent for use in the powder coating composition is a polyacrylate commercially available under the tradename PERENOL from Henkel Corporation, Rocky Hill, Conn. Additionally useful polyacrylate flow control agents are commercially available under the tradename ACRYLON MFP from Protex France, and those commercially available from BYK-Chemie GmbH, Germany. Numerous other compounds and other acrylic resins known to persons skilled in the art also can be used as a flow control agent. The flow control agents may constitute, e.g., from about 0.1% to about 5% by weight of the powder coating composition, and more preferably from about 0.2% to about 1% by weight. The flow control agent assists in achieving a uniform thin film for coating 34 applied onto inner surface 28, and may further assist in reducing lumping and dust issues that may otherwise occur with fine powder particles.

Examples of suitable surfactants for use in the powder coating composition include wetting agents, emulsifying agents, suspending agents, dispersing agents, and combinations thereof. Examples of suitable surfactants for use in the coating composition include non-ionic and anionic surfactants (e.g., waxes). The surfactants may constitute from about 0.1% to about 10% by weight of the powder coating composition, and more preferably from about 0.2% to about 5% by weight.

The powder coating composition of the present disclosure can be prepared by methods well known in the art, such as by individually heating the one or more polyesters (e.g., the first and second polyesters), and optionally, the one or more epoxy- and/or phenoxy-containing compounds, to a sufficient temperature to melt each ingredient, and admixing the molten ingredients, such as in a single screw or double screw extruder, to provide a substantially homogeneous blend. The resulting blend may then be compounded into pellets, crystallized, and milled (e.g., cryogenic milling) to attain the desired fine particle sizes. As discussed above, the relatively low molecular weights of the polyester(s) increases the ease of milling to the fine particle sizes. One or more of the optional additives may then be mixed with the polyester particles, and the resulting composition may be sieved and packaged for subsequent use. Alternatively, one or more of the optional additives may be included in a melt blend including the one or more polyesters.

During use, the powder coating composition may be applied to a metal substrate, such as at weld seam 30. While the powder coating composition is particularly useful as a weld seam coating, the powder coating composition may also be used for a variety of other coating applications. For example, in some embodiments, the powder coating composition may be applied to assist in forming lid seal 24 and/or bottom seal 26 (shown in FIG. 1).

After being applied, the powder coating composition may be heated to melt the composition, and then actively or passively cooled to solidify the molten composition, thereby forming a hardened continuous thin coating (e.g., coating 34). As discussed above, the powder coating composition is preferably capable of forming thin coatings having coating thicknesses of about 40 micrometer or less that are substantially free of pores. This allows the underlying metal substrates to be downgauged to thinner wall thicknesses, and be reliably shaped with necking machines to form multiple-necking arrangements. During use, the pore-free coating (e.g., coating 34) protects the underlying metal substrate from corrosion or other environmental conditions, thereby preserving the integrity of the container (e.g., container 10).

EXAMPLES

The present disclosure is more particularly described in the following examples that are intended as illustrations only, since numerous modifications and variations within the scope of the present disclosure will be apparent to those skilled in the art.

Powder coating compositions of Examples 1 and 2 were prepared with components as presented below in Table 1. As shown in Table 1, the powder coating composition of Example 1 included a first polyester having a low melt viscosity and epoxy-containing compounds. In comparison, the powder coating composition of Example 2 included the first polyester having a low melt viscosity, and a second polyester having a higher glass transition temperature, but was free of epoxy-containing compounds.

TABLE 1

| Component | Example 1 (percent by weight) | Example 2 (percent by weight) |
|---|---|---|
| First Polyester | 63.6 | 63.6 |
| Second Polyester | 0 | 10 |
| Epoxy Resin, type 10 | 10 | 0 |
| Epoxy Resin, type 4 | 1 | 0 |
| White Pigment | 16 | 16 |
| Barium Sulfate Filler | 4 | 4 |
| Aluminum Silicate Filler | 2 | 3 |
| Polyacrylate Additive A | 0.4 | 0.4 |
| Polyacrylate Additive B | 1.5 | 1.5 |
| Polyethylene Surfactant Wax | 0.5 | 0.5 |
| Polyamide Surfactant Wax | 0.5 | 0.5 |
| Flow Control Agent | 0.5 | 0.5 |

The first polyester was commercially available under the tradename GRILTEX D2343 from EMS-Griltech, Switzerland, which had a weight-average molecular weight of 38,000; a number-average molecular weight of 15,000; a melt viscosity of 75 Pa-s; a melt flow index of 140 grams/10 minutes; and a glass transition temperature of 20° C. The second polyester was commercially available under the tradename GRILTEX D2360 from EMS-Griltech, Switzerland, which had a weight-average molecular weight of 52,000; a number-average molecular weight of 21,000; a melt viscosity of 220 Pa-s; a melt flow index of 48 grams/10 minutes; and a glass transition temperature of 69° C.

The epoxy resin, type 10 was a type 10 epoxy resin commercially available under the tradename Araldite GT 6810 from Huntsman Advanced Materials GmbH, Switzerland. The epoxy resin, type 4 was a type 4 epoxy resin commercially available under the tradename Kukdo KB6814 from Kukdo Chemical Co., Ltd., South Korea. The flow control agent was an agent commercially available from BYK-Chemie GmbH, Germany.

Figure 3:
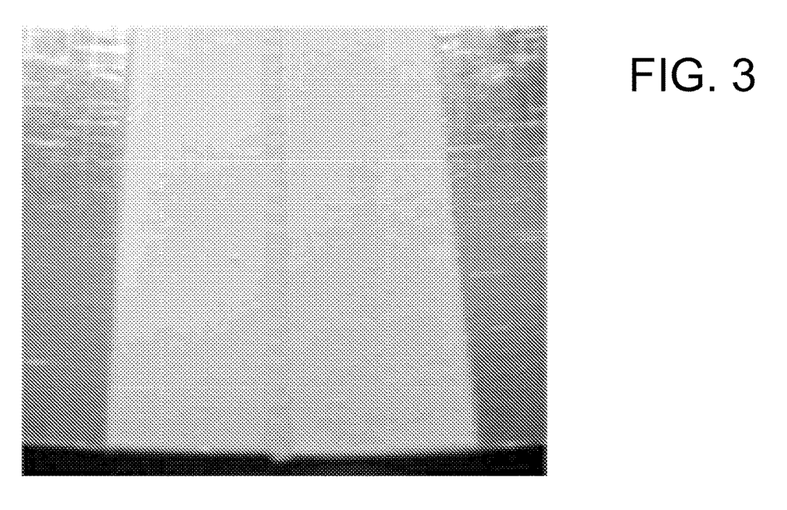
FIG. 3 is a photograph of an applied coating of the powder coating composition of the present disclosure, illustrating a fine particle size distribution and lower viscosity.

Each powder coating composition of Examples 1 and 2 had a fine particle size distribution such that from about 99.9% to 100% by weight of the particles passed through an 80-micrometer sieve, and such that from about 95% to 100% by weight of the particles passed through a 63-micrometer sieve. FIG. 3 illustrates an applied coating of the powder coating composition of Example 1 covering a weld seam on a metal strip, after being melted and solidified.

Figure 4:
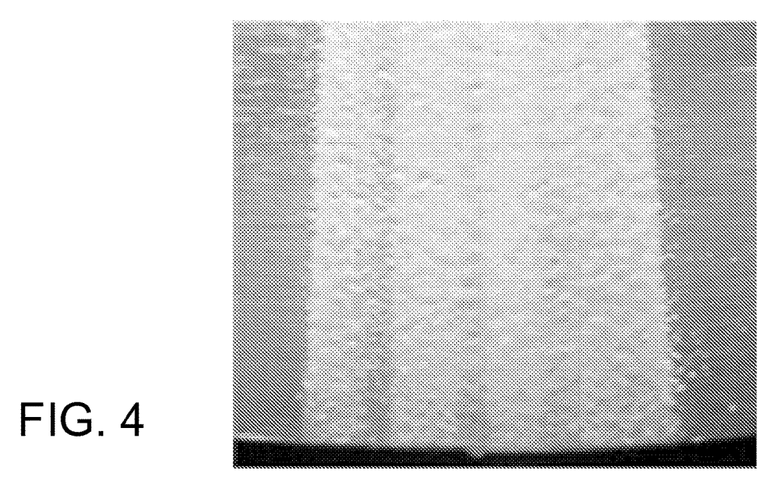
FIG. 4 is a photograph of an applied coating of a conventional powder coating composition, illustrating a more coarse particle size distribution.

The powder coating composition of Example 3 was commercially available under the tradename VECODUR VP 98 BF from Valspar Corporation, Minneapolis, Minn. This is a popular powder coating composition in the industry for covering weld seams on a variety of metal containers. FIG. 4 illustrates an applied coating of the powder coating composition of Example 3 covering a weld seam on a metal strip, after being being melted and solidified. A comparison of the powder particles of the compositions in FIGS. 3 and 4 show that the composition of Example 1 exhibited a finer particle size distribution and an improved flow compared to the composition of Example 3.

Porosity Test

Coatings from the powder coating compositions of Examples 1 and 3 were formed on metal substrates for determining their porosities at different coating thicknesses. For each porosity test, a sample metal strip of tin-plated steel (cut from a can having a wall thickness of 0.12 millimeters) and retaining the formed coating was placed in a bath of a 3.2% copper sulfate ($CuSO_4$) and 0.5% acetic acid in water solution such that the formed coating was fully immersed in the solution. A cathode pole lead of a direct current (DC) 9-volt battery was also connected to an edge of the metal substrate. A 2-centimeter-by-8 centimeter copper plate (having a 2-millimeter thickness) connected to an anode pole of the battery was then inserted into the solution and moved along the formed coating at a distance of about five millimeters from the coating for about three seconds.

Figure 5A:
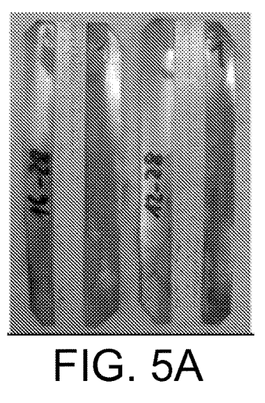
FIGS. 5A-5C are photographs of example coatings having different coating thicknesses after being subjected to the porosity test.
Figure 5B:
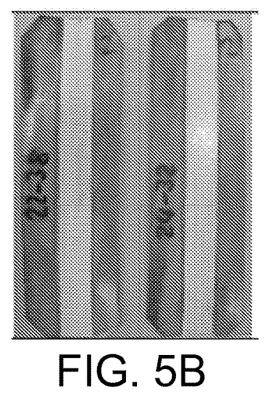
Figure 5C:
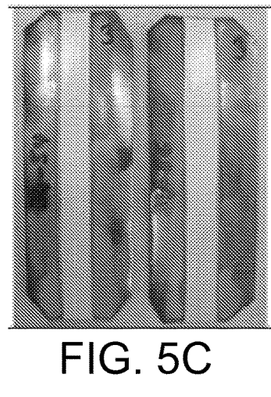
Figure 6A:
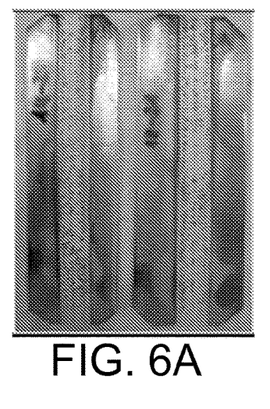
FIGS. 6A-6C are photographs of comparative example coatings having different coating thicknesses after being subjected to the porosity test.
Figure 6B:
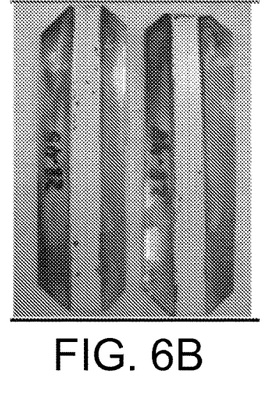
Figure 6C:
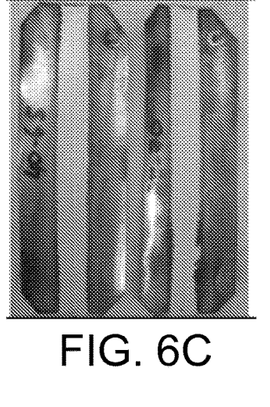
Figure 7A:
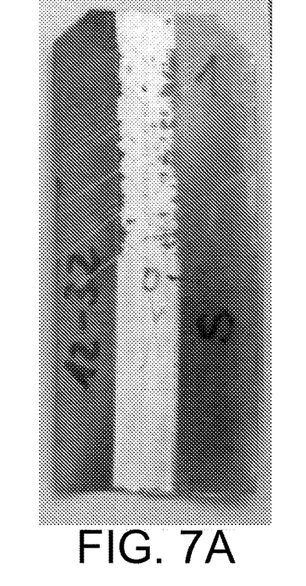
FIGS. 7A and 7B are photographs of example coatings having different coating thicknesses after being subjected to the adhesion processing test.
Figure 7B:
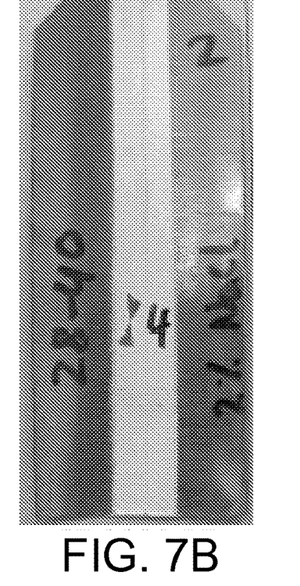
Figure 8A:
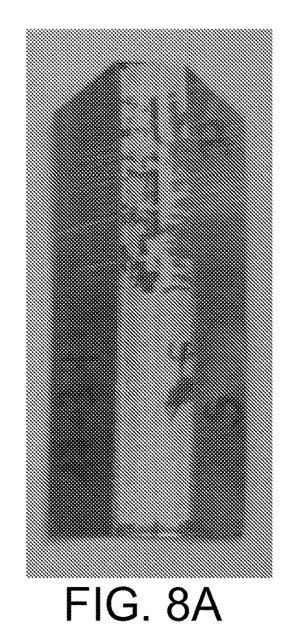
FIGS. 8A and 8B are photographs of comparative example coatings having different coating thicknesses after being subjected to the adhesion processing test.
Figure 8B:
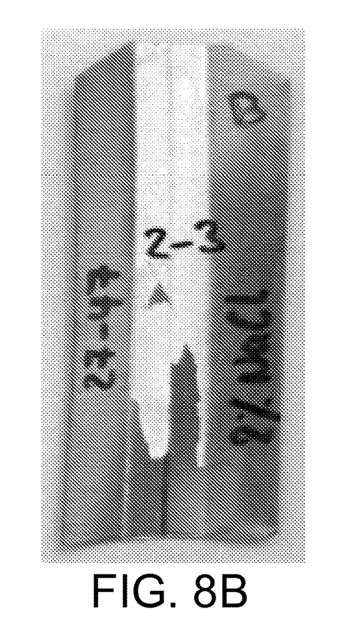

The metal strip was then removed from the solution, dried, and inspected for the presence of pores that were visible to the naked eye. FIGS. 5A-5C show the porosity test results for the coatings of Example 1 for different coating thicknesses, and FIGS. 6A-6C show the porosity test results for the coatings of Example 3 for different coating thicknesses. Tables 2 and 3 below list the visual observations made for these tested samples. The coating thicknesses were measured along the weld seams, and exhibited variations due to the test equipment used, particularly for the coatings of Example 3 due to its coarser powders. Nonetheless, Tables 2 and 3 (and FIGS. 5A-5C and 6A-6C) illustrate the trends attained with the powder coating compositions of Examples 1 and 3.

TABLE 2

Example 1

| FIG. | Coating Thickness (micrometers) | Porosity Results |
|---|---|---|
| 5A, left side | 16-28 | Moderate porosity |
| 5A, right side | 12-28 | Moderate porosity |
| 5B, left side | 22-38 | No porosity |
| 5B, right side | 24-32 | No porosity |
| 5C, left side | 34-54 | No porosity |
| 5C, right side | 34-56 | No porosity |

TABLE 3

Example 3

| FIG. | Coating Thickness (micrometers) | Porosity Results |
|---|---|---|
| 6A, left side | 14-29 | High porosity |
| 6A, right side | 12-31 | High porosity |
| 6B, left side | 28-45 | Low porosity |
| 6B, right side | 28-48 | Low porosity |
| 6C, left side | 40-65 | No porosity |
| 6C, right side | 34-70 | No porosity |

A ranking of "no porosity" referred to no pores being visible to the naked eye and corresponded to the tested coating being substantially free of pores, and the rankings of "low porosity", "moderate porosity", and "high porosity" referred to increasing amounts of porosity that were visually observed, as shown in FIGS. 5A-5C and 6A-6C. As shown, the powder coating composition of Example 1 was substantially free of porosity for coating thicknesses down to about 25 micrometers. This was significantly lower than that attainable with the powder coating composition of Example 3. As such, the powder coating composition of Example 1 is capable of forming thin coatings over metal substrates, such as weld seam coatings. This allows the powder coating composition of Example 1 to be used with downgauged containers having thinner walls, and multiple necking arrangements.

Adhesion Processing Test

Coatings from the powder coating compositions of Examples 1 and 3 were also formed on metal substrates for determining how well the applied coatings withstood processing conditions for different types of foods packaged in metal containers. Table 4 lists the different solutions (solutions D, S, R, and NaCl) chosen for cans containing a wide variety of food fillings, where solutions D and R are considered non-aggressive solutions, and solutions S and NaCl are considered highly-aggressive solutions.

TABLE 4

| Solution | Solution Components |
|---|---|
| Solution D | Demineralized water |
| Solution S | 40 grams concentrated acetic acid |
| | 24 grams gelatin |

TABLE 4-continued

| Solution | Solution Components |
|---|---|
| Solution R | 24 grams sodium chloride<br>0.4 grams crystalline sodium sulfide (Na$_2$S•9H20)<br>quantity sufficient (q.s.) water to about 800 milliliters<br>16 grams citric acid crystals<br>3.2 grams vitamin C (ascorbic acid)<br>q.s. water to about 800 milliliters |
| Solution NaCl | 2% sodium chloride solution |

After the test samples were exposed to the different solutions for one hour at 121° C., each sample was removed and visually inspected for coating integrity and adhesion to the metal substrate. Tables 5 and 6 respectively list the adhesion test results for the coatings of Examples 1 and 3, which are ranked as "good", "average", and "poor" results for coating protection and adhesion.

TABLE 5

Example 1

| Solution | 12-34 micrometer coating thickness | 22-44 micrometer coating thickness | 30-62 micrometer coating thickness |
|---|---|---|---|
| Solution D | Good | Good | Good |
| Solution S | Average | Good | Good |
| Solution R | Average | Good | Good |
| Solution NaCl | Poor | Average | Good |

TABLE 6

Example 3

| Solution | 14-45 micrometer coating thickness | 25-52 micrometer coating thickness | 37-80 micrometer coating thickness |
|---|---|---|---|
| Solution D | Good | Good | Good |
| Solution S | Poor | Good | Good |
| Solution R | Average | Good | Good |
| Solution NaCl | Poor | Poor | Good |

As shown in Tables 5 and 6, the coatings of Examples 1 and 3 each exhibited good or average performances for the non-aggressive solutions D and R, regardless of porosity. For the highly-aggressive solutions S and NaCl, however, the coatings of Example 1 exhibited better performance than the coatings of Example 3, particularly for the samples with lower coating thicknesses.

Corresponding results are also shown in FIGS. 7A, 7B, 8A, and 8B (and listed in Table 6 below) for the highly-aggressive solutions, and for low coating thicknesses. As shown, the coatings of Example 1 (shown in FIGS. 7A and 7B) exhibited better performance than the coatings of Example 3 (shown in FIGS. 8A and 8B).

TABLE 7

| FIG. | Coating Thickness (micrometers) | Solution | Results |
|---|---|---|---|
| 7A (Example 1) | 12-32 | Solution NaCl | Average |
| 7B (Example 1) | 28-40 | Solution S | Good |
| 8A (Example 3) | 17-34 | Solution NaCl | Poor |
| 8B (Example 3) | 27-47 | Solution S | Poor |

While not wishing to be bound by theory, it is believed that non-porous coatings are required for use with the highly-aggressive solutions S and NaCl to protect the underlying metal substrates. As discussed above, the powder coating compositions of Example 1 are capable of forming non-porous coatings that have lower coating thicknesses than those of the powder coating compositions of Example 3. As such, the coatings formed from the powder coating compositions of Example 1 may be thin, while still providing good protection and adhesion to the underlying metal substrates.

All patent and patent application documents referenced in the present disclosure are incorporated by reference to the extent that they do not conflict with the present disclosure. Although the present disclosure has been described with reference to preferred embodiments, workers skilled in the art will recognize that changes may be made in form and detail without departing from the spirit and scope of the disclosure.

The invention claimed is:

1. A method for forming a coating on a container, the method comprising:
   providing a coating composition comprising from about 50% by weight to 100% by weight of a blend of:
   at least 70% by weight of one first semi-crystalline polyester with an average glass transition temperature ranging from about −20° C. to about 40° C., wherein the first semi-crystalline polyester has a weight average molecular weight from about 20,000 to about 50,000, a melt flow index of 80grams/10 minutes to 170 grams/10 minutes, and a melt viscosity of less than 200 Pascal-seconds; and
   at least one second amorphous polyester with a glass transition temperature from 40° C. to 100° C., wherein the second amorphous polyester has a weight average molecular weight from about 40,000 to about 70,000, a melt flow index of 25 grams/10 minutes to 75 grams/10 minutes, and a melt viscosity greater than the melt viscosity of the first semi-crystalline polyester;
   wherein the coating composition is in the form of a powder having particles with particle sizes such that at least about 95% by weight of the particles are capable of passing through a 63-micrometer sieve;
   applying the coating composition in powder form to at least a portion of a substrate of the container;
   melting the coating composition on the substrate or the portion thereof; and
   solidifying a molten coating composition to form a coating adhered to the substrate or the portion thereof, the coating having an average coating thickness less than about 40 micrometers, and wherein the coating is substantially free of pores.

2. The method of claim 1, and further comprising forming the substrate as a side seam of the container, and wherein applying the coating composition in powder form to the substrate or portion thereof comprises applying the coating composition to the side seam.

3. The method of claim 1, wherein the average coating thickness ranges from about 25 micrometers to about 35 micrometers.

4. The method of claim 1, wherein the blend of one or more polyesters has a melt viscosity less than about 200 Pascal-seconds.

5. A container comprising:
   a side seam; and
   a coating disposed on at least a portion of the side seam with an average coating thickness less than about 40 micrometers, wherein the coating is substantially free of pores, and is formed from a coating composition comprising:

at least 70% by weight of one first semi-crystalline polyester with an average glass transition temperature ranging from about −20° C. to about 40° C., wherein the first semi-crystalline polyester has a weight average molecular weight from about 20,000 to about 50,000, a melt flow index of 80 grams/10 minutes to 170 grams/10 minutes, and a melt viscosity of less than 200 Pascal-seconds; and at least one second amorphous polyester with a glass transition temperature from 40° C. to 100° C., wherein the second amorphous polyester has a weight average molecular weight from about 40,000 to about 70,000, a melt flow index of 25 grams/10 minutes to 75 grams/10 minutes, and a melt viscosity greater than the melt viscosity of the first semi-crystalline polyester;

wherein the coating composition is in the form of a powder having particles with particle sizes such that at least about 95% by weight of the particles are capable of passing through a 63-micrometer sieve.

6. The container of claim 5, wherein the average coating thickness ranges from about 25 micrometers to about 35 micrometers.

7. The container of claim 5, wherein the blend of one or more polyesters comprises at least one first polyester having an average melting temperature ranging from about 120° C. to about 200° C.

8. The container of claim 5, wherein the coating composition is substantially free or free of epoxy-functional compounds.

9. The container of claim 5, wherein the blend of one or more polyesters has a melt viscosity less than about 200 Pascal-seconds.

10. A coating composition comprising:
from about 50% by weight to 100% by weight of a blend of:

at least 70% by weight of one first semi-crystalline polyester with an average glass transition temperature ranging from about −20° C. to about 40° C., wherein the first semi-crystalline polyester has a weight average molecular weight from about 20,000 to about 50,000, a melt flow index of 80 grams/10 minutes to 170 grams/10 minutes, and a melt viscosity of less than 200Pascal-seconds; and at least one second amorphous polyester with a glass transition temperature from 40° C. to 100° C., wherein the second amorphous polyester has a weight average molecular weight from about 40,000 to about 70,000, a melt flow index of 25 grams/10 minutes to 75 grams/10 minutes, and a melt viscosity greater than the melt viscosity of the first semi-crystalline polyester;

wherein the coating composition is in the form of a powder having particles with particle sizes such that at least about 95% by weight of the particles are capable of passing through a 63-micrometer sieve; and wherein the coating composition, when applied on a substrate, forms a coating having an average coating thickness less than about 40 micrometers, and wherein the coating is substantially free of pores.

11. The coating composition of claim 10, wherein the blend of one or more polyesters comprises at least one first polyester having an average melting temperature ranging from about 120° C. to about 200° C.

12. The coating composition of claim 10, wherein the blend of one or more polyesters has a melt viscosity less than about 200 Pascal-seconds.

13. The coating composition of claim 10, wherein the melt flow index of the coating composition is greater than about 80 grams/10 minutes.

* * * * *